United States Patent [19]

Fitzgerald et al.

[11] Patent Number: 6,120,892
[45] Date of Patent: Sep. 19, 2000

[54] WATERBORNE FLUOROPOLYMER SOLUTIONS FOR TREATING HARD SURFACES

[75] Inventors: John J. Fitzgerald, Newark, Del.; Thomas Clark Felder, III, Kennett Square, Pa.

[73] Assignee: E. I. du Pont de Nemours and Company, Wilmington, Del.

[21] Appl. No.: 09/248,068

[22] Filed: Feb. 11, 1999

Related U.S. Application Data

[62] Division of application No. 08/974,798, Nov. 20, 1997, Pat. No. 5,919,527.

[51] Int. Cl.$^7$ ............................. B32B 13/12; B32B 17/10
[52] U.S. Cl. ........................... 428/341; 428/421; 428/442; 428/446; 428/514; 428/537.1; 428/540; 428/541
[58] Field of Search ................................. 428/341, 421, 428/442, 446, 514, 537.1, 540, 541; 427/388.4, 389.7, 393.6

[56] References Cited

U.S. PATENT DOCUMENTS

| | | | |
|---|---|---|---|
| 3,282,905 | 11/1966 | Fasick et al. | 526/245 |
| 3,378,609 | 4/1968 | Fasick et al. | 525/227 |
| 4,127,711 | 11/1978 | Lori et al. | 526/345 |
| 4,147,851 | 4/1979 | Raynolds | 526/245 |
| 4,478,975 | 10/1984 | Dessaint et al. | 524/871 |
| 4,499,146 | 2/1985 | Piacenti et al. | 428/422 |
| 4,595,428 | 6/1986 | Anthony et al. | 148/187 |
| 4,931,505 | 6/1990 | Miyazaki et al. | 525/125 |
| 5,011,713 | 4/1991 | Lenti et al. | 427/393.6 |

FOREIGN PATENT DOCUMENTS

| | | |
|---|---|---|
| 0 554 667 A1 | 8/1993 | European Pat. Off. . |
| 612770 | 8/1994 | European Pat. Off. . |
| 2639353 | 5/1990 | France . |
| 4226537 | 2/1996 | Germany . |
| 4426536 | 2/1996 | Germany . |

*Primary Examiner*—D. S. Nakarani

[57] ABSTRACT

A method for imparting water, oil or stain repellency to HARD SURFACES comprising application to the surface of an effective amount of a composition comprising monomers copolymerized in the following percentages by weight:

(a) from about 40% to about 90% of at least one monomer of formula I:

$$R_f-Q-A-C(O)-C(R)=CH_2 \qquad I$$

wherein $R_f$ is a straight or branched-chain perfluoroalkyl group of 2 to about 20 carbon atoms, R is H or $CH_3$, A is O, S, or $NR_1$ wherein $R_1$ is H or a $C_1$–$C_4$ alkyl, and Q is alkylene of 1 to about 15 carbon atoms, hydroxyalkylene of 3 to about 15 carbon atoms, —$(C_nH_{2n})$ $(OC_qH_{2q})_m$—, —$SO_2$—$NR_1(C_nH_{2n})$— or —$CONR_1(C_nH_{2n})$— wherein $R_1$ is H or $C_1$–$C_4$ alkyl, n is 1 to about 15, q is 2 to about 4, and m is 1 to about 15;

(b) from about 2% to about 50% of a monomer of formula IIA or IIB or a mixture thereof:

$$(CH_2=C(R)COZ(CH_2)_r{}^+NR_2R_3R_4)X^- \qquad IIA$$

and $$CH_2=C(R)COZ(CH_2)_rNR_2R_3(O) \qquad IIB$$

wherein

R is H or $CH_3$, $R_2$ and $R_3$ are each independently $C_1$–$C_4$ alkyl, hydroxyethyl, or benzyl or $R_2$ and $R_3$ together with the nitrogen atom form a morpholine, pyrrolidine, or piperidine ring, $R_4$ is H or $C_1$–$C_4$ alkyl or $R_2$, $R_3$, and $R_4$ together with the nitrogen form a piperidine ring, Z is —O— or —$NR_4$— r is 2 to 4, and $X^-$ is an anion, provided that the nitrogen is from about 40% to 100% salinized, quaternized, or present as amine oxide.

6 Claims, No Drawings

WATERBORNE FLUOROPOLYMER SOLUTIONS FOR TREATING HARD SURFACES

This is a division of application Ser. No. 08/974,798 filed Nov. 20, 1997, now U.S. Pat. No. 5,919,527.

FIELD OF THE INVENTION

This invention relates to a method for treating hard surfaces including construction materials with a waterborne fluorochemical copolymer composition to impart water, oil and stain repellency.

BACKGROUND OF THE INVENTION

Hard surface materials used primarily for building or construction purposes such as brick, stone, wood, concrete, ceramics, tile, glass, stucco, plaster, gypsum drywall, particle board or chip board, are generally rigid or semi-rigid materials that are frequently exposed to weathering or to water-based cleaners which tend to penetrate and ultimately degrade the materials. They may also be exposed to solvents or oils.which tend to stain or otherwise affect their appearance or useful life. Treating agents for such materials should confer both oil and water repellency to the substrate in a single treatment, and should have a suitably long life with outdoor exposure.

The use of fluorochemical copolymers for imparting oil and water repellency to textiles and paper products is known. For example, U.S. Pat. No. 4,147,851 of Raynolds issued Apr. 3, 1979, discloses that copolymers comprising 50% to 85% by weight of a perfluoroaliphatic acrylate/methacrylate monomer and 15% to 50% by weight of dialkylaminoalkyl acrylate/methacrylahte monomer or the corresponding amine salt, quaternary or amine oxide monomer are useful in oil and water repellency applications on textiles, leather and paper products. This patent does not teach that such copolymers have desirable properties when applied as a waterborne composition to hard surfaces with outdoor exposure.

However, the use of certain other fluorochemical copolymers for imparting water, oil and stain repellency to hard surfaces is.known. Such copolymers include a fluorinated polyester/isocyanate/ catalyst composition in a diluting solvent. Use of perfluoropolyethers is known for protection against atmospheric pollutants. An acrylate/fluoroacrylate/silicone or polyethylene wax/water-soluble stabilizer/water-insoluble coalescent agent/water composition is known for use in an anti-soiling treatment of construction materials.

U.S Pat. No. 4,931,505 issued in 1990 discloses a coating composition comprising (A) a fluorine-containing copolymer with a fluorine content based on fluoroolefin of at least 10% by weight, and (B) a fluorine-containing copolymer of a polyfluorocarbon monomer with a hydrophilic group-containing monomer wherein said hydrophilic group is a member of a group containing, among others, a quaternary ammonium salt and an amine salt. It is said to provide a weather and stain resistant coating layer on surfaces such as metal, glass, and the like, but the coating solutions contain relatively high percentages of flammable volatile solvents, and these coatings can change the appearance of the coated surface by adding an adhering film.

Thus, known compositions for treating hard surfaces can contain volatile-solvents which tend to pollute the atmosphere and are increasingly subject to adverse regulations, are flammable, add a coating layer to the substrate which affects its appearance or produce films which can blister or peel away from the substrate.

There is a need for a treatment composition which imparts durable water, oil and stain repellency to hard surfaces with a minimum release of volatile organiic solvents. Preferably the treating compositions are soluble or self-dispersible in water for ease of application and cleanup, form coatings which do not change the appearance of the hard surface, and are not:subject to blistering or peeling. The present invention provides such a composition.

SUMMARY OF THE INVENTION

The present invention comprises a method for imparting water, oil or stain repellency to hard surfaces comprising application to the surface of an effective amount of a composition comprising monomers copolymerized in the following percentages by weight:

(a) from about 40 to about 90% of at least one monomer of formula I:

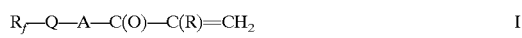

wherein:
$R_f$ is a straight or branched-chain perfluoroalkyl group of 2 to about 20 carbon atoms,
R is H or $CH_3$,
A is O, S or $NR_1$ wherein $R_1$ is H or $C_1$–$C_4$ alkyl, and
Q is alkylene of 1 to about 15 carbon atoms, hydroxyalkylene of 3 to about 15 carbon atoms, —$(C_nH_{2n})$ $(OC_qH_{2q})m$—, —$SO_2$—$NR_1(C_nH_{2n})$—, or —$CONR_1$ $(C_nH_{2n})$—, wherein $R_1$ is H or $C_1$–$C_4$ alkyl, n is 1 to about 15, q is 2 to about 4, and m is 1 to about 15; and (b) from about 2% to about 50% of a monomer of formula IIA or IIB or a mixture thereof:

      IIA and

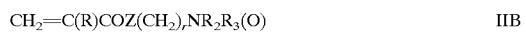      IIB wherein
R is H or $CH_3$,
$R_2$ and $R_3$ are each independently $C_1$–$C_4$ alkyl, hydroxyethyl, or benzyl or $R_2$ and $R_3$ together with the nitrogen atom form a morpholine, pyrrolidine, or piperidine ring,
$R_4$ is H or $C_1$–$C_4$ alkyl or $R_2$, $R_3$, and $R_4$ together with the nitrogen form a piperidine ring,
Z is —O— or —$NR_4$ —
r is 2 to 4, and
$X^-$ is an anion,
provided that the nitrogen is from about 40% to 100% salinized, quaternized, or present as amine oxide.

The present invention further comprises the above method wherein the composition further comprises from about 0% to about 25% of a monomer selected from the group consisting of glycidyl (meth)acrylaLe, blocked isocyanatoalkyl(meth)acrylate, acrylamide, vinylidene chloride, (meth)acrylic acid, sulfatoalkyl(meth)acrylate, polyoxyehttlylelie (met-h)acrylate, styrene and vinyl toluene.

The present invention further comprises a hard surface treated in accordance with the method of this invention.

DETAILED DESCRIPTION OF THE INVENTION

Superior water, oil and stain repellency can be imparted to hard surfaces including construction materials such as brick, stone, wood, concrete, ceramics, tile, glass, stucco, gypsum drywall, particle board, or chip board by the application of certain waterborne fluorochemical copolymer compositions. These can be applied to the surface by any convenient means such as painting with a brush, wiping with a sponge or cloth, spraying,.and other means.

The highly efficient copolymers useful for this process or method of treatment are characterized in that they contain monomers copolymerized in the following percentages by weight, relative to the total weight of the copolymers:

(a) from about 40% to about 90% of at least one monomer of formula I:

$$R_f\text{—Q—A—C(O)—C(R)}=CH_2 \qquad\qquad I$$

wherein:

$R_f$ is a straight or branched-chain perfluoroalkyl group of 2 to about 20 carbon atoms, R is H or $CH_3$, A is O, S or $NR_1$ wherein $R_1$ is H or $C_1$–$C_4$ alkyl, and Q is alkylene of 1 to about 15 carbon atoms, hydroxyalkylene of 3 to about 15 carbon atoms, $—(C_nH_{2n})(OC_qH_{2q})_m—$, $—SO_2—NR_1(C_2H_{2n})—$, or $—CONR_1(C_nH_{2n})—$, wherein $R_1$ is H or $C_1$–$C_4$ alkyl, n is 1 to about 15, q is 2 to about 4, and m is 1 to about 15; and (b) from about 2% to about 50% of a monomer of formula IIA or IIB or a mixture thereof:

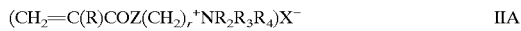

$$(CH_2=C(R)COZ(CH_2)_r{}^+NR_2R_3R_4)X^- \qquad\qquad IIA$$

and

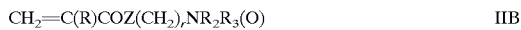

$$CH_2=C(R)COZ(CH_2)_rNR_2R_3(O) \qquad\qquad IIB$$

wherein

R is H or $CH_3$, $R_2$ and $R_3$ are each independently $C_1$–$C_4$ alkyl, hydroxyethyl, or benzyl or $R_2$ and $R_3$ together with the nitrogen atom form a morpholine, pyrrolidine, or piperidine ring, $R_4$ is H or $C_1$–$C_4$ alkyl or $R_2$, $R_3$, and $R_4$ together with the nitrogen form a piperidine ring, Z is —O— or $—NR_4—$ r is 2 to 4, and $X^-$ is an anion, provided that the nitrogen is from about 40% to 100% salinized, quaternized, or present as amine oxide.

The composition used in the method of the present invention is preferably in the form of a dispersion. It is typically employed as an aqueous dispersion.

Preferably in the monomer of formula I, $R_f$ is a straight chain prefluoroalkyl group of 2 to about 20 carbon atoms, A is O, and Q is an alkylene of 1 to about 15 carbon atoms. Suitable monomers of formula I include $CF_3CF_2(CF_2)_x C_2H_4OC(O)—C(H)=CH_2$ or $CF_3CF_2(CF_2)x\ C_2H_4OC(O)—C(CH_3)=CH_2$ wherein x is an even integer of from 2 to about 18, or mixtures thereof. More preferably the monomer of formula I is a perfluoroalkylethyl acrylate or methacrylate, with a perfluorocarbon chain length $(R_f)$ distribution predominantly in the range of 8 to 14 carbons. Such monomers are known and can be prepared by either esterification of the appropriate alcohol $CF_3CF_2(CF_2)_xC_2H_4OH$, with acrylic acid or methacrylic acid or by tranesterification with methyl acrylate or methyl methacrylate, for example, as described in U.S. Pat. No. 3,282,905. The alcohols are commercially available as mixtures wherein x varies.

The proportion of the monomer of formula I is at least 40% relative to the total weight of the copolymer. If it is present in lower amounts, the repellency can be unacceptably poor. The proportion should be less than 90%. If it is present in higher amounts, the amounts of the solubilizing monomer of formula II may be too low, resulting in decreased dispersibility. Preferably the proportion of the monomer formula I is between 50% and 85% by weight, and still more preferably between 65% and 85%, for the best balance of dispersion stability, solubility and repellency performance.

The proportion of the monomer of formula IIA or IIB is at least 2% for adequate solubilization. A proportion above 50% could impair oil and water repellency. Preferably the proportion of the monomer of formula II (as salinized, quaternized, or present as amine oxide), by weight is between 5% and 40%, and still more preferably between 15 and 30% for the best balance of properties.

Preferably the monomer of formula IIA or IIB is diethylaminoethyl methacrylate. It is at least 40% salinized, ruaternized, or present as amine oxide for adequate solubilizing effect, but may be as high as 100% in this form. The salinization, quaternization or conversion to amine oxide can be performed on the copolymer containing the free amine, or can be carried out on the amine group before polymerization with equally good results. The salinizing group can be an acetate, halide, sulfate or other known salinizing group.

The amine salt monomers are prepared by reacting the corresponding tertiary dialkylaminoalkyl acrylate or dialkylaminoalkyl methacrylate ester or corresponding acrylamide or methacrylamide with an organic or inorganic acid, such as hydrochloric, hydrobromic, sulfuric or acetic acid. The tertiary dialkylaminoalkyl acrylate or dialkylaminoalkyl methacrylate esters are known in the art and can be prepared by either reacting a tertiary amine alcohol of the formula, $HO(CH_2)_rNR_2R_3$ with acryloyl or methacryloyl halide or, preferably, by transesterification with methyl acrylate or methyl methacrylate.

The tertiary dialkylaminoalkyl acrylamides or methacrylamides are prepared by acylating the corresponding dialkylaminoalkyl amine with acryloyl or methacryloyl halide in the presence of an acid acceptor such as triethylamine or pyridine.

The quaternary ammonium monomers are prepared by reacting the aforesaid acrylate or methacrylate esters of corresponding acrylamide or methacrylamide with a di-(lower alkyl) sulfate, a lower alkyl halide, trimethylphosphate or triethylphosphate. Dimethyl sulfate and diethyl sulfate are preferred quaternizing agents.

The amide oxide monomers are prepared by reacting the aforesaid acrylate or methacrylate ester or corresponding acrylamide or methyacrylamide with conventional oxidizing agents such as hydrogen peroxide or peracetic acid and the like.

The nature of the anion, $X^-$, in the quaternary ammonium and amine salt monomer is, in general, determined by the method of synthesis. Usually, $X^-$ is an halide ion, such as chloride, bromide, or iodide, or an acetate ion, a sulfate ion, a phosphate ion or an alkylsulfate ion. It is known, however, that quaternary ammonium salts can also be prepared by reacting a tertiary amine with an alkyl ester of benzene or toluenesulfonic acid; in such event, $X^-$ is a benzenesulfonate or toluenesulfonate anion.

Up to about 25% by weight of other monomers may optionally be incorporated into the copolymers to provide adhesion to specific substrates, impart film formation properties, provide stability at wider pH ranges, or provide compatibility with added solvents for specific applications.

This optional monomer is any polymerizable monomer including but not limited to crosslinkable monomers such as glycidyl (meth)acrylate, (blocked) isocyanatoalkyl-(meth) acrylates, and acrylamides, vinyl monomers such as vinylidene chloride, alkyl (meth)acrylates such as ethylhexyl methacrylate and stearyl methacrylate, ionomers such as (meth)acrylic acid and sulfatoalkyl(meth)acrylates, nonionic water-soluble monomers such as polyoxyethylene (meth)acrylates, and aromatics such as styrene and vinyl toluene.

The polymerization of the monomers of formula I and IIA or IIB, and any optional monomer present is conveniently initiated by any free radical initiator inclhuding azo initiators such as 2,2'-azobis(2,4-dimethylvaleronitrile). Such Azo initiators are sold by E. I. du Pont de Nemours and Company, Wilmington, Del., commercially under the name of "VAZO" 67, 52 and 64, and by Wako Pure Industries, Ltd., under the name "V-501". If desired, a chain transfer agent such as dodecyl mercaptan may be added before polymerization. Initiator or chain transfer agent concentration is typically 0.1 to 2% based on the weight of the total monomers.

The polymerization step is carried out in a solvent such as acetone, methylisobutyl ketone, ethyl acetate, isopropanol, or other ketones, esters and alcohols or mixtures thereof. After polymerization, the above solvent can be retained in the final composition if required for an intended application, or it can be removed by distillation to form a waterborne composition with a very low volatile organic content. A dispersion of the composition is prepared using conventional means known to those skilled in the art.

The method for imparting water, oil, or stain repellency to hard surfaces of the present invention has several advantages over previously known methods. The copolymer composition used in the present invention provides durable water, oil, and stain repellency to a wide variety of hard surfaces. The copolymer composition used in the present invention can be readily dispersed in water without added surfactants, and forms dispersions with very low volatile content, very low flammability, and excellent stability under high shear conditions and high temperatures. The dispersions are easy to apply without requiring a pretreatment, can be applied to damp materials, and cleanup is easy. The dispersions are stable when subjected to freeze/thaw cycling, and have excellent stability at high ionic strength, with consequently excellent stability in hard water. Coatings formed using the method of the present invention do not change the appearance of the coated surface, do not require heating to achieve good oil and water repellency, and are not subject to blistering or peeling because moisture trapped in the surface is allowed to vaporize freely.

Due to these advantages the method of the present invention is useful for imparting water, oil, or stain repellency to a wide variety of hard surfaces subject to a variety of adverse conditions. Materials such as brick, stone, wood, concrete, ceramics, tile, glass, stucco, gypsum drywall, particle board or chip board subject to outdoor weathering, cleaners, solvents or oils benefit from the method of the present invention. The repellency benefits provided are suitably durable under the various adverse conditions encountered.

The following examples illustrate the preparation of compositions for the inventive process and their use on various hard surfaces. Other methods of preparation will be apparent to those skilled in the art.

EXAMPLE 1

A vessel fitted with a stirrer, thermometer, and reflux condenser was charged with 125 parts of fluoromonomer of formula I available from E. I. du Pont de Nemours and Co., Wilmington, Del., as "ZONYL" TM and having the formula: $CF_3CF_2(CF_2)_xC_2H_4OC(O)C(CH_3)=CH_2$ wherein x=4, 6, 8, 10, 12, 14, 16, 18, 20 in the respective relative amounts of about 4%, 33%, 29%, 14%, 7%, 6%, 4% ,2% and 1%., said monomer having a weight average molecular weight of 543; 53.6 parts of a monomer of formula II, N,N-diethylamino- ethyl methacrylate; and 118.8 parts of solvent methyl isobutyl ketone (MIBK). The charge was purged with nitrogen at 40° C. for 30 minutes. "VAZO" 67 (0.79 parts) was then added to initiate polymerization and the charge was stirred for 16 hours at 70° C. under nitrogen.

A mixture of water (422.1 parts) and acetic acid (14.4 parts) at room temperature was added to the above copolymer mixture at 70° C. The reflux condenser was replaced with a distillation column and the MIBK was removed at reduced pressure. The copolymer solids, adjusted to 30% with water, contained 70% perfluoroalkylethyl methacrylate units and 30% N,N-diethylaminoethyl methacrylate units on a weight basis. The nitrogen group was approximately 83% salinized.

EXAMPLE 2

A vessel fitted with a stirrer, thermometer, and reflux condenser was charged with 70 parts of a fluoromonomer of forhmula I of the composition described in Example 1, 30 parts of a monomer of formula II, N,N-diethylaminoethyl methacrylate, and 100 parts of isopropyl alcohol. The charge was purged with nitrogen at 40° C. for 30 minutes. "VAZO" 67 (0.5 parts) was then added to initiate polymerization and the charge was stirred for 16 hours at 70° C. under nitrogen.

Peracetic acid (24.3 parts) was cautiously added to the copolymer mixture at 70° C. The copolymer solids contained 70% perfluoroalkylethyl methacrylate units and 30% N,N-diethylaminoethyl methacrylate units on a weight basis. In this case, residual solvent was not distilled from the composition, demonstrating that the presence of volatile solvent does not degrade the functionality of the copolymers useful for this invention.

EXAMPLE 3

A vessel fitted with a stirrer, thermometer, and reflux condenser was charged with 673.5 parts of a fluoromonomer of formula I available from E. I. du Pont de Nemours & Co., Wilmington, Del., as "ZONYL" TA-N and having the formula: $CF_3CF_2(CF_2)_xC_2H_4OC(O)C(H)=CH_2$ wherein x=6, 8, 10, 12, 14, 16, 18 in the respective relative amounts of about 3%, 50%, 31%, 10%, 3%, 2% and 1%., said monomer having an weight average molecular weight of 569; 119.5 parts of a monomer of formula II, N,N-diethylaminoethyl methacrylate; 19 parts of glycidyl methacrylate; and 505 parts of methyl isobutyl ketone (MIBK). The charge was purged with nitrogen at 40° C. for 30 minutes. "VAZO" 67 (0.6 parts) was then added to initiate polymerization and the charge was stirred for 16 hours at 70° C. under nitrogen.

A mixture of water (2435 parts) and acetic acid (59.5 parts) at room temperature was added to the above copolymer mixture at 70° C. The reflux condenser was replaced with a distillation column and the MIBK was removed at reduced pressure. A total of 3103 parts of copolymer solution was obtained. The copolymer solids (23.1%) contained 82.2% perfluoroalkylethyl acrylate units, 15.4% N,N-diethylaminoethyl methacrylate units and 2.4% glycidyl methacrylate units. The nitrogen was approximately 100% salinized.

EXAMPLES 4 to 20

Examples 4 to 20 were prepared according to the general procedures exemplified by Examples 1, 2 and 3, with appropriate changes as required depending on whether an acrylate, methacrylate or other fluoromonomer of formula I was used, whether a third monomer component was added or not, and whether the resulting copolymer was salinized/quaternized with acetic acid, peracetic acid or tartaric acid. The compositions of copolymer examples 4 to 20 are summarized in Table 1 below, with the weight % of each monomer given in parentheses following the abbreviation for the monomer. For the salinizing agent, the figure in parentheses is the % of the nitrogen group which is salinized:

TABLE 1

Compositions of Copolymer Examples 4 to 20

| Ex. | Formula I Monomer | Formula II Monomer | Additional Monomer | Salinizing, Quaternizing or Oxidizing Agent |
|---|---|---|---|---|
| 4 | ZFM (63%) | DEAM (27%) | AA (10%) | Acetic acid (95%) |
| 5 | ZFM (70%) | DEAM (25%) | MA (5%) | Acetic acid (62%) |
| 6 | ZFM (70%) | DEAM (30%) | none | Peracetic acid |
| 7 | ZFM (70%) | DEAM* (30%) | none | DMS (100%) |
| 8 | ZFAN (70%) | DEAM (30%) | none | Acetic acid (100%) |
| 9 | ZFM (70%) | DEAM (30%) | none | Tartaric acid (100%) |
| 10 | ZFM (75%) | DEAM (15%) | 2-EHMA (10%) | Acetic acid (100%) |
| 11 | ZFM (70%) | DEAM (15%) | 2-EHMA (15%) | Acetic acid (100%) |
| 12 | ZFM (85%) | DEAM (5%) | PEG (10%) | Acetic acid (100%) |
| 13 | FX-14 (74%) | DEAM (26%) | none | Acetic acid (80%) |
| 14 | ZFM (65%) | DEAM (30%) | VDC (5%) | Acetic acid (100%) |
| 15 | ZFM (60%) | DEAM (39%) | VDC (10%) | Acetic acid (100%) |
| 16 | ZFM (55%) | DEAM (30%) | VDC (15%) | Acetic acid (100%) |
| 17 | ZFM (85%) | DEAM (15%) | none | Acetic acid (100%) |
| 18 | ZFM (85%) | DEAM (15%) | none | Acetic acid (100%) |
| 19 | ZFM (85%) | DEAM (15%) | none | Acetic acid (100%) |
| 20 | ZFAN (75%) | DEAM (25%) | none | Acetic acid (80%) |

ZFM is "ZONYL" TM, a perfluoroalkylethyl methacrylate available from the E. I. du Pont de Nemours and Co., Wilmington, Del., and is described in Example 1. ZFAN is "ZONYL" TA-N, a perfluoroalkylethyl acrylate available from the E. I. du Pont de Nemours and Co., Wilmington, Del. and is described in Example 3. FX-14 is "FLUORAD" FX-14 fluorochemical methacrylate from 3M Co., Minneapolis, Minn. Its structure is $R_f$—$SO_2$—N—($C_2H_5$)$CH_2$—$CH_2$—O—C(O)—C($CH_3$)=$CH_2$.

DEAM is diethylaminoethyl methacrylate. DEAM* is DEAM 100% quaternized with dimethyl sulfate (DMS) before polymerization. AA is acrylic acid. MA is methacrylic acid. 2-EHMA is 2-ethylhexyl methacrylate. PEG is polyethylene glycol 400 monomethyl methacrylate. VDC is vinylidene chloride.

In Examples 17, 18 and 19, respectively, 0.33%, 0.66% and 1.0% based on polymer weight of dodecyl mercaptan was added before polymerization, as a chain transfer agent.

The peracetic acid used was 32 weight % in dilute acetic acid from Aldrich Chemical Co.

The tests in the following examples were used to evaluate the properties of various substrates when treated with the copolymers useful for this invention or with comparative examples.

EXAMPLE 21

This example demonstrated the improvements in the oil holdout/repellency of masonry when the copolymer of Example 1 was applied.

The copolymer of Example 1 was diluted to (A) 1% and (B) 5% on a weight basis with tap water and a single coating of (A) or (B) was applied to cinder blocks and terra cotta brick with a paint brush and allowed to air dry. The coated and uncoated portions of the masonry samples were then treated with drops of:

(I) Hexadecane (II) 10W-30 Motor oil (Amoco Amolube Low Detergent). Test results are summarized in the table below:

TABLE 2

| | Masonry Treatment Tests | | | | | |
|---|---|---|---|---|---|---|
| | Cinder Block | | | Terra Cotta Brick | | |
| | None | (A) 1% | (B) 5% | None | (A) 1% | (B) 5% |
| When applied | | | | | | |
| (I) | soaked | beaded | beaded | soaked | beaded | beaded |
| (II) | soaked | beaded | beaded | soaked | beaded | beaded |
| After 7 days | | | | | | |
| (I) | soaked | soaked | beaded | soaked | soaked | beaded |
| (II) | soaked | beaded | beaded | soaked | beaded | beaded |

The above results showed that dilutions of the Example 1 copolymer composition at concentrations as low as 1% repelled motor oil (II) at least 7 days on both the cinder block and terra cotta brick. When the concentration was 5%, a lower molecular weight oil such as hexadecane (I) was repelled for at least 7 days. Both fluids soaked instantly into the uncoated portion of the masonry.

EXAMPLE 22

This example demonstrated improved oil and water repellency when wood was treated with the copolymers of Examples 1 and 2. Results are compared with treatments using a leading commercial water repellent, trademarked "THOMPSON'S ULTRA" believed to contain paraffin wax and other alkylated compounds. The copolymer solution of Example 1 was diluted to 10 parts of solution in 90 parts of water and is referred to below as "10% C". The copolymer solution of Example 2 was diluted to 12 parts of solution to 88 parts of wahter and is referred to below as "12% D". Solution 10% C and Solution 12% D contained approximately equal percentages of fluorine. The commercial waterproofing composition was applied as is.

A single coating of each was painted onto clear pine wood strips and allowed to air dry at room temperature. Coated and uncoated portions of the samples were then treated with drops of mineral oil, hexadecane, and water, and repellency assessed over time. Results are given in Table 3 below. "CA" refers to the degrees of contact angle of the water drops, judged by visual inspection.

TABLE 3

| | Pine Wood Treatment Tests | | | |
|---|---|---|---|---|
| | 10% C | 12% D | "Ultra" | Bare Wood |
| When applied | | | | |
| Mineral Oil | beaded | beaded | soaked | soaked |
| Hexadecane | beaded | soaked | soaked | soaked |
| Water | beaded | beaded | beaded | soaked, |
| | CA > 90 | CA > 90 | CA > 90 | darkened wood |

TABLE 3-continued

Pine Wood Treatment Tests

|  | 10% C | 12% D | "Ultra" | Bare Wood |
|---|---|---|---|---|
| After 30 minutes |  |  |  |  |
| Mineral Oil | beaded | beaded | soaked | soaked |
| Hexadecane | beaded | soaked | soaked | soaked |
| Water | beaded | beaded | beaded | soaked |
|  | CA > 90 | CA = 90 | CA = 45 |  |
| After 90 minutes |  |  |  |  |
| Mineral Oil | beaded | soaked | soaked | soaked |
| Hexadecane | beaded | soaked | soaked | soaked |
| Water | beaded | beaded | beaded | soaked |
|  | CA = 90 | CA = 45 | CA = 20 |  |

The above results showed that the inventive treatment beaded water more effectively than application of a leading commercial waterproofing composition for the period of the test, and that applying the composition of Example 1 ("10% C") also beaded common oils.

EXAMPLE 23

This example demonstrated the weathering resistance of coatings of the Example 1 copolymer solution on concrete. A 4 foot by 4 foot (122 cm by 122 cm) section of outdoor concrete pavement was coated with a single application of a 5% aqueous solution of the copolymer solution of Example 1 and allowed to air dry at ambient temperature. The concrete pavement was then subjected to normal foot traffic, winter weather, snow, ice and snow shoveling conditions for the period of the tests.

The oil and water repellencies were assessed by determining the so-called "oil number" and "water number" of the coating. In these tests, a series of oils of varying viscosity and surface tension and a series of isopropanol (IPA)/water mixtures of various surface tension were applied dropwise to the concrete surface. The solutions were numbered 1 to 6, providing lower viscosity or lower surface tension as the number increased. The contact angles of drops placed on a surface generally declined as the oil or water number of the solution increased. When the contact angle dropped below 45 degrees, the number of the drop solution was recorded. Higher drop numbers indicated a more repellent coating. The liquids used for the above tests were as follows:

TABLE 4

Water and Oil Number Test Solutions

| Solution No. | Water No. Tests | Oil No. Tests |
|---|---|---|
| 1 | 2% IPA | Mineral oil |
| 2 | 5% IPA | 65% mineral oil; 35% n-hexadecane |
| 3 | 10% IPA | n-hexadecane |
| 4 | 20% IPA | n-tetradecane |
| 5 | 30% IPA | n-dodecane |
| 6 | 40% IPA | n-decane |

TABLE 5

Results of Exposure Tests on Concrete

| | 5% Solution; Ex. 1 | |
|---|---|---|
| Elapsed Days | Oil No. | Water No. |
| 0 | 6 | 5 |
| 10 | 6 | 4–5 |
| 62 | 3 | 4 |
| 120 | 2 | 3 |

Most oils which stain concrete, such as motor oil, transmission fluids, and greases, have a surface tension and viscosity equivalent to an oil number between 0 and 1, and will be repelled by surfaces with oil numbers greater than 1. As the results above showed, after 120 days exposure (which included foot traffic, rain, snow, salt, ice and abrasion by shoveling and plowing), the treated surface still repelled common staining oils. Similarly, rainfall, tap water and most aqueous solutions have surface tensions equivalent to a water number between 0 and 1, and these will be repelled by surfaces with water numbers greater than 1. As the above results illustrated, typical rainfall was still repelled after 120 days exposure. Untreated concrete wetted instantly with rainfall or common automotive oils. The coatings after 120 days showed no change in appearance, and were free of conventional problems of peeling and blistering.

EXAMPLE 24

This example showed the performance of a copolymer wherein the monomer of formula I was the perfluoroalkyl acrylate "ZONYL" TA-N as described in Example 3, the monomer of formula II was diethylaminoethyl methacrylate, and a third monomer component was glycidyl methacrylate.

The solution made in Example 3 was diluted to 10 parts in 90 parts of water and applied to cement patio blocks and pine strips. Numbered oil and water solutions described in Example 23 were applied to the treated and untreated surfaces and allowed to rest for 10 minutes. The drops were then blotted away from the substrates and the surface beneath the drops was examined for signs of discoloration or staining. The highest number that produced no visible stain was recorded.

TABLE 6

Results of Tests on Various Substrates

| Patio Block | | Pine | |
|---|---|---|---|
| Oil No. | Water No. | Oil No. | Water No. |
| With 10% solution from Ex. 3: | | | |
| 4 | 4 | 6 | 5 |
| With no treatment: | | | |
| 0 | 0 | 0 | 0 |

The above results showed that applying the copolymer solution of Example 3 provided excellent oil and water repellence and stain resistance to both patio block and pine.

In a further test, drops of 10W-30 motor oil and R&S Strauss Brake Fluid were applied to the treated and untreated patio block. After 5 hours, both fluids remained beaded with rio discoloration of the underlying concrete on the treated concrete. The fluids soaked into the untreated concrete immediately.

EXAMPLE 25

The samples prepared in Examples 4 to 20 were diluted to 0.6% fluorine with tap water, brushed onto pine and patio block, and allowed to dry under ambient conditions for about 24 hours. The treated surfaces were then tested with numbered oil and water drops as described in Example 23. The highest drop number giving a contact angle greater than 45 degrees was recorded. In most cases, drops with a lower contact angle than 45 degrees produced a visible darkening of the surface.

Typical rainfall corresponds to a test water number between 0 and 1, and most automotive fluids (10W-30 oil, transmission fluid, etc.) correspond to an oil test number between 0 and 1. Surfaces with oil and water numbers greater than 1 hold out these fluids. Surfaces with oil and water numbers of 0 are wetted instantly by these fluids.

TABLE 7

Test Results on Samples from Examples 4 to 20

|  | Pine | | Patio Block | |
| --- | --- | --- | --- | --- |
| Example No. | Oil No. | Water No. | Oil No. | Water No. |
| Untreated Surface | 0 | 0 | 0 | 0 |
| 4 | 2 | 5 | 4 | 6 |
| 5 | 1 | 4 | 4 | 5 |
| 6 | 1 | 5 | 3 | 6 |
| 7 | 4 | 3 | 3 | 3 |
| 8 | 3 | 3 | 5 | 6 |
| 9 | 2 | 4 | 4 | 6 |
| 10 | 2 | 6 | 3 | 6 |
| 11 | 3 | 5 | 3 | 5 |
| 12 | 2 | 3 | 2 | 4 |
| 13 | 2 | 5 | 1 | 4 |
| 14 | 2 | 6 | 1 | 4 |
| 15 | 2 | 5 | 1 | 3 |
| 16 | 2 | 6 | 1 | 4 |
| 17 | 3 | 5 | 3 | 5 |
| 18 | 4 | 6 | 5 | 6 |
| 19 | 4 | 5 | 6 | 6 |
| 20 | 4 | 5 | 5 | 6 |

The above results showed that applying copolymers of the inventive process provided oil and water repellency to both masonry and wood surfaces.

EXAMPLE 26

This example demonstrated that applying the copolymers of the inventive process was effective in making particle board oil- and water-repellent.

Ten parts of the copolymer solution of Example 1 was diluted with 90 parts tap water and applied with a brush to ¾ inch (1.9 cm) thick particle board. The treated article was allowed to air dry for 30 minutes at 50° F. (10° C.). An identical piece of particle board was left uncoated for comparison.

Water drops beaded on the surface when applied to the treated board. Water drops soaked into and darkened the untreated board immediately. The boards were then tested with 10W-40 motor oil and cold coffee. The motor oil beaded on the treated surface for greater than 12 hours and cold coffee did not stain the treated surface for greater than 30 min. Both the motor oil and coffee immediately penetrated and stained the untreated control.

EXAMPLE 27

This example demonstrated that treatment with the copolymers of the present invention is an effective oil- and water-repellent treatment for gypsum drywall.

Five parts of the copolymer solution of Example 1 was diluted with 95 parts tap water and applied by brush to a 2 feet×4 feet×½ inch (61 cm×122 cm×1.3 cm) piece of gypsum drywall (Georgia Pacific) and air dried at about 50° F. (10° C.) for about 30 minutes. Water drops applied to the treated drywall remained beaded for greater than 12 hours and soaked immediately into an uncoated piece of drywall. Water was then sprayed onto the treated drywall, and was observed to bead up without discoloring the surface. The untreated drywall darkened immediately. 10W-40 motor oil was applied to the treated drywall, and was observed to bead on the surface for greater than 12 hours without any noticable discoloration of the surface. The motor oil soaked into and stained the untreated drywall immediately. Panels of treated and untreated drywall showed no obvious differences in paintability after priming with an undercoat.

The treated drywall described above was tested for oil and water repellency after 4 months. Numbered oil and water drops were applied and the repellency was evaluated as described in Example 23. For comparison, a section of water-repellent drywall ("Dens-Shield" from Georgia-Pacific) was evaluated. Results are given below.

TABLE 8

Tests on Gypsum Drywall

|  | Oil No. | Water No. |
| --- | --- | --- |
| Example 27 treated Drywall | 5 | 6 |
| Commercial Water-repellent Drywall | 0 | 3 |

This example demonstrated that gypsum drywall was made durably oil and water repellent by treating the drywall with the copolymers of the present invention.

EXAMPLE 28

A panel of common hard surfaced materials as shown in Table 9 below was coated with a brush-applied layer of 5% and 1% solutions of the copolymer of Example 1, and then dried at 90° F. (32° C.) for one hour. Oil and water ratings were determined as described in Example 23.

TABLE 9

Tests on Common Hard Surfaced Materials

|  | Oil No. | Water No. |
| --- | --- | --- |
| Concrete Block | | |
| 5% | 5 | 6 |
| 1% | 1 | 5 |
| Red Brick | | |
| 5% | 3 | 6 |
| 1% | 3 | 6 |
| Granite | | |
| 5% | 1 | 3 |
| 1% | 1 | 3 |
| Marble | | |
| 5% | 1 | 3 |
| 1% | 1 | 3 |
| Flagstone | | |
| 5% | 2–3 | 4–5 |
| 1% | 1 | 4–5 |

TABLE 9-continued

Tests on Common Hard Surfaced Materials

|  | Oil No. | Water No. |
|---|---|---|
| Terra Cotta Brick | | |
| 5% | 4–5 | 5 |
| 1% | 2–3 | 5 |
| Sandstone | | |
| 5% | 4–5 | 6 |
| 1% | 4 | 6 |
| Glass | | |
| 5% | 2 | 4 |
| 1% | 2 | 4 |

This example demonstrated that application of the copolymers of the current invention provide effective oil- and water-repellence to a wide variety of common hard surfaces.

What is claimed:

1. A hard surface of rigid construction or building material which has been treated by a method for imparting water, oil or stain repellency, said method comprising application without heating to the surface of an effective amount of a composition consisting of monomers copolymerized in the following percentages by weight:

(a) from about 40% to about 90% of at least one monomer of formula I:

$$R_f\text{—}Q\text{—}A\text{—}C(O)\text{—}C(R)\!=\!CH_2 \qquad I$$

wherein $R_f$ is a straight or branched-chain perfluoroalkyl group of 2 to about 20 carbon atoms, R is H or $CH_3$, A is O, S, or $NR_1$ wherein $R_1$ is H or a $C_1$–$C_4$ alkyl, and Q is alkylene of 1 to about 15 carbon atoms, hydroxyalkylene of 3 to about 15 carbon atoms, —$(C_nH_{2n})$ $(OC_qH_{2q})_m$—, —$SO_2NR_1(C_nH_{2n})$— or —$CONR_1$ $(C_nH_{2n})$— wherein $R_1$ is H or $C_1$–$C_4$ alkyl, n is 1 to about 15, q is 2 to about 4, and m is 1 to about 15;

(b) from about 2% to about 50% of a monomer of formula IIA or IIB or a mixture thereof:

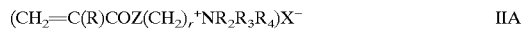

$$(CH_2\!=\!C(R)COZ(CH_2)_r{}^+\!NR_2R_3R_4)X^- \qquad IIA$$

and

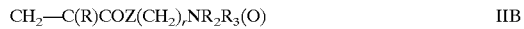

$$CH_2\!=\!C(R)COZ(CH_2)_rNR_2R_3(O) \qquad IIB$$

wherein

R is H or $CH_3$, $R_2$ and $R_3$ are each independently $C_1$–$C_4$ alkyl, hydroxyethyl, or benzyl or $R_2$ and $R_3$ together with the nitrogen atom form a morpholine, pyrrolidine, or piperidine ring, $R_4$ is H or $C_1$–$C_4$ alkyl or $R_2$, $R_3$, and $R_4$ together with the nitrogen form a piperidine ring, Z is —O— or —$NR_4$— r is 2 to 4, and $X^-$ is an anion, provided that the nitrogen is from about 40% to 100% salinized, quaternized, or present as amine oxide.

2. The surface of claim 1 wherein the material is selected from the group consisting of brick, stone, wood, concrete, ceramics, tile, glass, stucco, gypsum drywall, particle board, chip board, granite, marble, flagstone, and sandstone.

3. The surface of claim 1 wherein an amount of the composition applied to the surface is such to deposit from about 0.01 g fluorine per meter squared to about 4 g fluorine per meter squared.

4. The surface of claim 1 wherein for the monomer of formula I, Rf is a straight chain perfluoroalkyl group of 2 to about 20 carbon atoms, A is O, and Q is alkylene of 1 to about 15 carbon atoms.

5. The surface of claim 4 wherein the monomer of formula I is $CF_3CF_2(CF_2)_xC_2H_4OC(O)$—$C(H)\!=\!CH_2$ or $CF_3CF_2$ $(CF_2)x\ C_2H_4OC(O)$—$C(CH_3)\!=\!CH_2$ wherein x is an even integer from 2 to 18, or mixtures thereof.

6. The surface of claim 1 wherein formula I is perfluoroalkylethyl (meth)acrylate and formula IIA or IIB is diethylaminoethyl (meth)acrylate.

* * * * *